J. D. NOYES.
GRIPPING TOOL.
APPLICATION FILED JUNE 26, 1918.
1,311,991.
Patented Aug. 5, 1919.
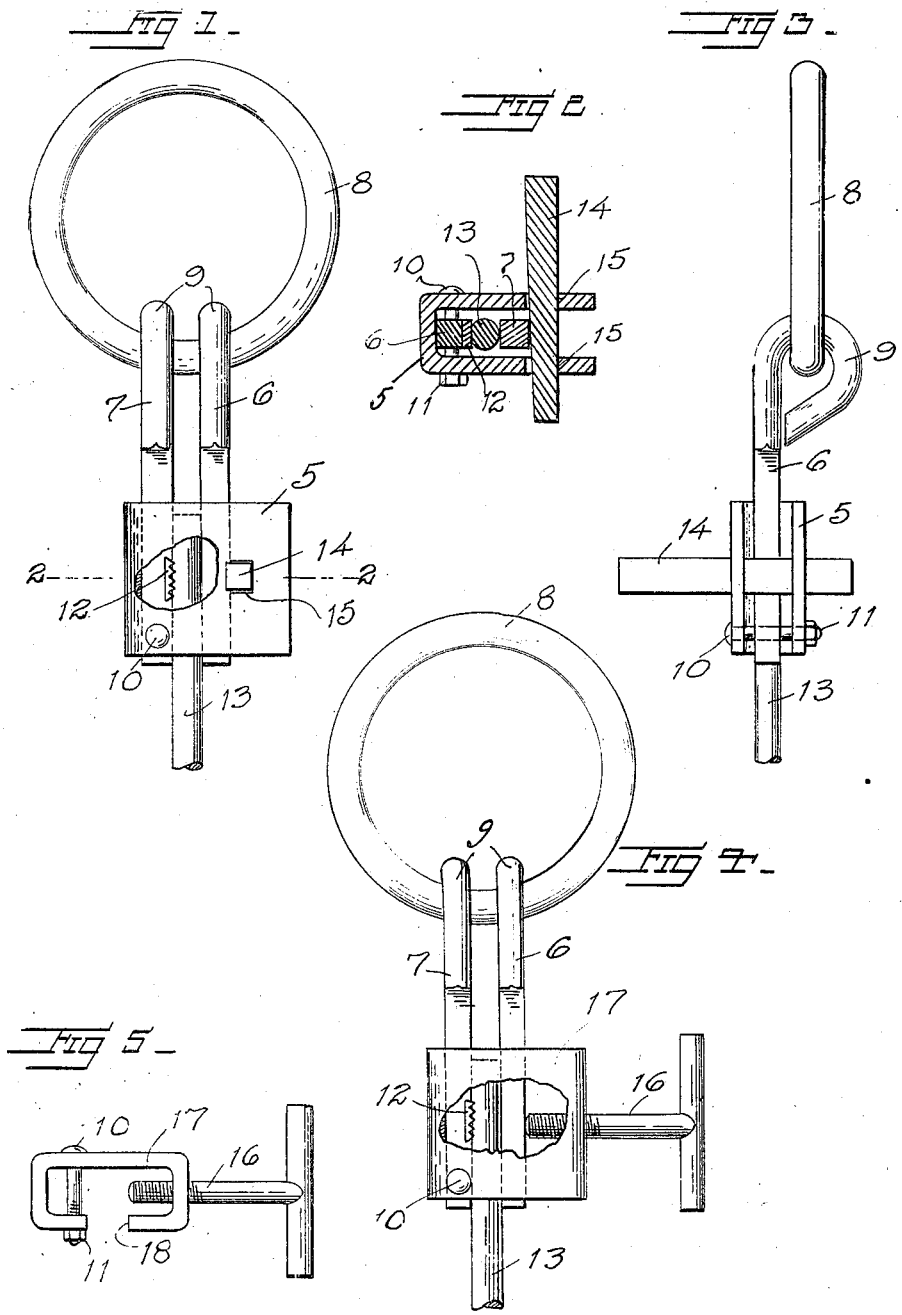
Inventor
Jesse D. Noyes
By
Attorneys

UNITED STATES PATENT OFFICE.

JESSE D. NOYES, OF PLEASANTVILLE, PENNSYLVANIA.

GRIPPING-TOOL.

1,311,991.   Specification of Letters Patent.   Patented Aug. 5, 1919.

Application filed June 26, 1918. Serial No. 242,034.

*To all whom it may concern:*

Be it known that I, JESSE D. NOYES, a citizen of the United States, residing at Pleasantville, in the county of Venango and State of Pennsylvania, have invented certain new and useful Improvements in Gripping-Tools, of which the following is a specification.

This invention relates to devices for gripping rods, wire or similar objects, the same being designed more particularly for use in connection with oil or gas well work.

The invention has for its object to provide a simple and efficient gripping device of the kind stated, the same being so constructed and arranged that the object is firmly gripped with a straight pull thereon without kinking or bending the same.

With the object stated in view, the invention consists in a novel combination and arrangement of parts to be hereinafter described and claimed, and in order that the same may be better understood, reference is had to the accompanying drawing forming a part of this specification.

In the drawing,

Figure 1 is a front elevation of the device, with parts broken away;

Fig. 2 is a cross section on the line 2—2 of Fig. 1;

Fig. 3 is a side elevation of the device;

Fig. 4 is a view similar to Fig. 1 showing a slightly modfied form of the device, and Fig. 5 is a plan view of certain parts shown in Fig. 4.

Referring specifically to the drawing, the supporting body of the clamp is a yoke-shaped member 5 between the two sides of which are positioned two parallel, elongated clamping bars 6 and 7, respectively, projecting a sufficient distance from one end of the yoke for attachment to a suspension ring 8, these projecting ends of the bars being formed with eyes 9 through which the ring is placed. The yoke is positioned transversely of the clamping bars.

Through the sides of the yoke 5 and through the bar 7 passes a bolt 10 secured by a nut 11, whereby said bar is fastened in the yoke, and that side of the bar which faces the bar 6 is fitted with a die block 12, the same seating in an undercut transverse groove in the bar and having its outer surface serrated.

The pipe, rod, wire or other elongated object 13 to be gripped is placed in the yoke 5 to seat between the bars 6 and 7, one side being in contact with the serrated face of the block 12, and upon forcing the bar 6 over toward the bar 7, the object is securely gripped between the two bars, the serrated face of the block effectually preventing slippage.

The bar 6 is forced over to obtain the hereinafter described clamping action by means of a wedge key 14 which passes through openings 15 in the sides of the yoke and transversely across the bar.

The clamping or gripping action may also be obtained by a screw 16. Where this screw is used, the body of the clamp is made as shown in Figs. 4 and 5, it being in the form of a link 17 having an opening 18 in one side for insertion of the rod, wire or other object to be gripped. The clamping bars 6 and 7 are arranged as before, but as stated, the bar 6 is operated by the screw 16, the same being threaded through one end of the link.

In both embodiments of the invention the bolt 10 provides a pivotal connection for the bar 7, so that when a hauling line or other pulling means is applied to the suspension ring 8, there is a tendency of the bar 7 to be crowded toward the object 13 so that the grip thereon is not broken. The object is firmly held without being bent or kinked, and it can be easily withdrawn from the well or other place.

There is sufficient room in the yoke 5 and the link 17 to permit the bar 6 to be swung outward from the bar 7 to enable the object 13 to be inserted between the same and the bar 6, and upon knocking out the wedge key 14, the object is at once released.

I claim:

1. A gripping tool comprising a pair of parallel elongated clamping bars, a support in which said bars are mounted, one bar being pivotally connected to the support and the other bar being free in the support for movement toward and from the first mentioned bar, means for forcing the second mentioned bar toward the first mentioned bar to grip an object lengthwise therebetween, and a suspension means connected to the outer ends of the bars.

2. A gripping tool comprising a pair of parallel elongated clamping bars, a support in which said bars are mounted, one bar being pivotally connected to the support and the other bar being free in the support for movement toward and from the first mentioned bar, means carried by the support and engaging the second mentioned bar transversely for forcing the same toward the first mentioned bar to grip an object lengthwise therebetween, and a suspension means connected to the outer ends of the bars.

In testimony whereof I affix my signature.

JESSE D. NOYES.